(12) United States Patent
Inoue et al.

(10) Patent No.: US 7,360,389 B2
(45) Date of Patent: *Apr. 22, 2008

(54) MANUFACTURING METHOD OF ARMATURE SHAFT, ARMATURE SHAFT AND ROTARY ELECTRIC MACHINE

(75) Inventors: Keiji Inoue, Hamana-gun (JP); Takayoshi Sasaki, Hamana-gun (JP); Koji Kidowaki, Toyohashi (JP); Nobuyuki Matsumoto, Hamakita (JP); Masanori Takeuchi, Nukata-gun (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 67 days.

This patent is subject to a terminal disclaimer.

(21) Appl. No.: 10/556,887

(22) PCT Filed: May 12, 2004

(86) PCT No.: PCT/JP2004/006720

§ 371 (c)(1),
(2), (4) Date: Nov. 15, 2005

(87) PCT Pub. No.: WO2004/102772

PCT Pub. Date: Nov. 25, 2004

(65) Prior Publication Data

US 2006/0273672 A1    Dec. 7, 2006

(30) Foreign Application Priority Data

May 19, 2003 (JP) ............................ 2003-140943
Jul. 24, 2003  (JP) ............................ 2003-279277
Oct. 20, 2003  (JP) ............................ 2003-360033

(51) Int. Cl.
*B21D 22/00*    (2006.01)

(52) U.S. Cl. .......................... 72/356; 470/10

(58) Field of Classification Search ............... 72/354.6, 72/356, 357, 358, 360, 88; 470/10
See application file for complete search history.

(56) References Cited

U.S. PATENT DOCUMENTS 5,211,048 A * 5/1993 Takahara et al. .............. 72/344

(Continued)

FOREIGN PATENT DOCUMENTS

JP    B2-2614394    9/1994

(Continued)

OTHER PUBLICATIONS

International Search Report dated Sep. 14, 2004.

*Primary Examiner*—Ed Tolan
*Assistant Examiner*—Debra M Wolfe
(74) *Attorney, Agent, or Firm*—Posz Law Group, PLC

(57) ABSTRACT

In a forging process step, a small diameter portion 12 is formed in the leading end portion of a cylindrical shaft material 30, and an installation depressed portion 11*d* is formed on a base end face of the shaft material 30 for installing a ball 15 therein to receive thrust force, by cold forging process using a forging mold 31. In a worm forming process after the forging process step, a worm 13 is formed in the small diameter portion 12 by rolled dies. The small diameter portion 12 and the installation depressed portion 11*d* are formed by cold forging process, so that an outer circumferential face of the small diameter portion 12 and an inner face of the installation depressed portion 11*d* become even surfaces with small surface roughness.

11 Claims, 6 Drawing Sheets

U.S. PATENT DOCUMENTS

| | | | |
|---|---|---|---|
| 6,390,230 B1 | 5/2002 | Shimizu et al. | |
| 6,543,569 B1 | 4/2003 | Shimizu et al. | |
| 7,231,794 B2* | 6/2007 | Kidowaki | 72/88 |
| 2001/0009114 A1* | 7/2001 | Laurandel | 74/425 |

FOREIGN PATENT DOCUMENTS

| | | |
|---|---|---|
| JP | U-6-66270 | 9/1994 |
| JP | A-7-1068 | 1/1995 |
| JP | A-7-214228 | 8/1995 |
| JP | A-9-174190 | 7/1997 |
| JP | A-10-136605 | 5/1998 |
| JP | A-11-146603 | 5/1999 |
| JP | A-2000-162059 | 6/2000 |
| JP | A-2001-65666 | 3/2001 |

* cited by examiner

MANUFACTURING METHOD OF ARMATURE SHAFT, ARMATURE SHAFT AND ROTARY ELECTRIC MACHINE

TECHNICAL FIELD

The present invention relates to a manufacturing method of an armature, an armature and a rotary electric machine.

BACKGROUND ARTS

A worm-equipped armature shaft, in which a worm is formed on an armature shaft, is used in a motor disclosed in JP11-146603-A, for example. On the armature shaft is fixed a core, on which a coil is wound thereon from a middle portion to a base end portion side, and a commutator side by side. Both end portions interposing the core and the commutator therebetween serve as bearing portions, which are in slide contact with a pair of bearings disposed in the housing. Correspondingly, the leading end portion of the armature shaft is smaller in diameter than a portion to fix the core and the commutator thereon. On the small diameter portion is formed a worm to be engaged with a worm wheel for driving a motor output shaft. In assembling the motor, it is necessary to insert the armature shaft into the bearings from the leading end thereof. An outer diameter of the worm is configured to be smaller than the bearing portions supported by the bearings so that the worm does not come in contact with the bearing in the insertion time.

Conventionally, these worm-equipped armature shaft is formed by working a cylindrical shaft material. Firstly, a cutting process is performed to form the small diameter portion by cutting the outer circumferential face in the leading end portion on which the worm is to be formed. Next, a grinding process is performed from the small diameter portion to an entire of a base end side portion than the small diameter portion to form the outer circumferential face of the bearing portion in high accuracy. Then, by rotating rolled dies and moving them in a radial direction against the small diameter portion processed by the cutting process, the worm is formed. The worm-equipped armature shaft is manufactured in this manner.

However, the surface of the worked portion becomes a coarse surface as conventionally known, and the outer circumferential face of the small diameter portion formed by the cutting process becomes a coarse surface. Thus, when the worm is formed on the small diameter portion, the outer circumferential face of the small diameter portion, on which the worm is to be formed, is the coarse surface, so that a state of the outer circumferential face of the small diameter portion influences the accuracy of the worm, causing an issue to decrease the accuracy of the worm. When the accuracy of the worm is low, the engagement with the worm wheel deteriorates, to cause such issues as a noise occurrence from the engagement portion and low transmission efficiency. Thus, it is considered to increase the accuracy of the worm by grinding the outer circumferential face of the small diameter portion after the cutting process to form the outer circumferential face in an even surface. However, this method increases manufacturing steps and is not a smart way.

Further, an armature shaft is known, which can receive a steel ball in a ball receiving groove (in an installation depressed portion) formed in an axial end of the armature shaft in a depressed manner to bring the steel ball in contact with a plate provided on an end face of a yoke of a motor so that a thrust force acting on the armature shaft is received at the steel ball and the plate (refer to JP-07-033847-B2, for example). Conventionally, the groove for installing the steel ball is formed by a cutting process, specifically, by putting a cutting blade on the axial end of the armature shaft and moving the cutting blade in an axial direction of the shaft in rotating the shaft.

In a case that a manufacturing step to apply a cold forging process to the shaft is included in manufacturing the armature shaft, the groove for installing the steel ball therein is formed on the axial end of the armature shaft in the above-described cutting process after the cold forging process.

Accordingly, the armature shaft is work hardened by a form fluxion in the cold forging process, to cause such an issue that the cutting blade becomes expensive and the life of the cutting blades is shortened, to form the groove for installing the steel ball on the end face of the hardened armature shaft.

In addition, the armature shaft and the steel ball rotates relative to each other in the groove, thus they rotate in contact with each other on the inner face of the groove. However, the groove is formed by the cutting process, so that the surface roughness of the inner face of the groove is relatively large by the cutting lines due to the cutting blades. This causes various malfunctions such as unusual noise occurrence by bumping motions of the armature shaft and the steel ball, uneven wears of the inner face and the steel ball, and rotation transmission loss.

The present invention is achieved to solve the above-described issues. A first object is to provide a manufacturing method of a worm-equipped armature shaft that can enhance an accuracy of a worm without increasing manufacturing steps.

A second object is to provide: a worm-equipped armature shaft having a large accuracy of a worm without increasing manufacturing steps; and a rotary electric machine provided with the worm-equipped armature shaft.

A third object is to provide: a manufacturing method of an armature shaft having an installation depressed portion at its end face to install a thrust-receiving ball therein, the method being capable of easily forming the installation depressed portion and improving a surface roughness of the installation depressed portion, thereby reducing various malfunction occurrences in the installation depressed portion; an armature shaft manufactured by use of the manufacturing method; and a rotary electric machine provided with the armature shaft.

DISCLOSURE OF THE INVENTION

To achieve the above-described first object, a manufacturing method of the armature shaft according to the present invention is a manufacturing method of a worm-equipped armature shaft to provide a cylindrical shaft material with a small diameter portion in a leading end side portion of a shaft body, which has a fixing portion to fix a core or to fix a core and a commutator thereon and has a bearing portion to be supported by a bearing, and with a worm in the small diameter portion, and comprises:

a forging process step, in which the small diameter portion is formed in the shaft material by a cold forging process using a forging mold provided with a small diameter portion forming mold portion for forming the small diameter portion and a shaft body supporting mold portion for supporting a portion corresponding to the shaft body; and a worm forming process step after the forging process step, in which the worm is formed in the small diameter portion by a rolling die.

According to the above-described manufacturing method, the small diameter portion is formed by cold forging process. Thus, it is possible to improve a surface roughness of an outer circumferential face of the small diameter portion relative to a case in which the small diameter portion is formed by cutting process, and to make the outer circumferential face in an even surface. An accuracy of the worm is influenced by a state of the outer circumferential face of the small diameter portion. By forming the outer circumferential face in the even surface, the accuracy of the worm increases. Especially, when the accuracy of the worm is low, an engagement of the worm with the worm wheel deteriorates, causing such malfunctions as a continuous noise from an engagement portion in an operation time, and low transmission efficiency. Correspondingly, by the manufacturing method according to the present invention, the worm can be formed in high accuracy, so that the malfunctions can be prevented from occurring.

The forging mold is provided with the small diameter portion forming mold portion for forming the small diameter portion in the shaft material and a shaft body supporting mold portion for supporting the portion of the shaft material corresponding to the shaft body. In the forging mold, relatively large load acts on the small diameter portion forming mold portion, so that wear in the small diameter portion forming mold portion is larger than that in the shaft body supporting mold portion. Thus, by separating these mold portions, it becomes possible to replace only the small diameter portion forming mold portion, and to continuously use the shaft body supporting mold portion, a replacement of which is not necessary at the same time as the small diameter portion forming mold portion. Thus, it is possible to decrease a cost for the forging mold and a manufacturing cost of the armature shaft.

In the above-described manufacturing method, it is desirable that a split face is placed at a step portion or at a proximity to the step portion, which is formed between a first mold portion constituting the small diameter portion forming mold portion and a second mold portion constituting the shaft body supporting mold portion.

In performing cold forging process, lubricating oil is put on a work surface (support surface) of the small diameter portion forming mold portion and the shaft body supporting mold portion to protect the shaft material. In this regard, a step is provided between the first mold portion constituting the small diameter portion forming mold portion and the second mold portion constituting the shaft body supporting mold portion, and the lubricating oil tends to accumulate at the step. As described above, however, by placing the split face between the first mold portion and the second mold portion at the step portion or at the proximity to the step portion, it becomes possible to discharge the lubricating oil accumulated at the step with ease through a gap at the split face. Accordingly, it is possible to prevent the accumulation of lubricating oil at the step from deteriorating a process of the shaft material.

In the above-described manufacturing method, when a leading end bearing portion is formed in a leading end portion of the small diameter portion, it is desirable that the leading end bearing portion is formed simultaneously with the small diameter portion in the shaft material in the forging process step. Accordingly, it is not necessary in particular to prepare a manufacturing step for forming the leading end bearing portion.

In the above-described manufacturing method, when a depressed portion is formed on a base end face of the shaft body, it is desirable that the depressed portion is formed simultaneously with the small diameter portion in the shaft material in the forging process step. Accordingly, it is not necessary in particular to prepare a manufacturing step for forming the depressed portion.

In the above-described manufacturing method, it is desirable that the shaft body supporting mold portion can be separated into a plurality of mold portions in an axial direction of the armature shaft. Thus, in a case to manufacture various types of the worm-equipped armature shaft having varied lengths in the shaft body, it is possible to adapt to them with ease by replacing only a part of the mold portions of the shaft body supporting mold portion in accordance with the length of the shaft body.

In the above-described manufacturing method, it is desirable to perform a grinding process step, in which an entire of the circumferential face of the shaft body is ground by bringing a grinding stone into a slide contact with the outer circumferential face of the shaft body, before performing the worm forming process step.

When a working fiducial position in forming the worm 13 in the small diameter portion is set to the outer circumferential face of the shaft body 11, by grinding the outer circumferential face of the shaft body 11, which is to be the fiducial position, in a preceding manufacturing step before forming the worm, the accuracy of the worm 13 is further increased.

In addition, by grinding the entire of the outer circumferential face of the shaft body, it is possible to remove the lubricating oil put on the outer circumferential face of the shaft body simultaneously.

To achieve the above-described second object, a worm-equipped armature shaft according to the present invention is one formed by processing a cylindrical shaft material and provided with: a shaft body, which has: a fixing portion to fix a core or to fix a core and a commutator thereon and a bearing portion to be supported by a bearing; a small diameter portion, which is continuously provided in the leading end side portion of the shaft body; and a worm, which is formed in the small diameter portion, wherein the small diameter portion is formed by a cold forging process, and the worm is formed in the small diameter portion by a rolled die after the cold forging process.

As described above, the worm-equipped armature shaft according to the present invention is one, in which the worm is formed in the small diameter portion, which is formed by the cold forging process, by the rolled die. When the small diameter portion is formed by the cold forging process, the surface roughness of an outer circumferential face of the small diameter portion is improved relative to a case in which the small diameter portion is formed by cutting process, and the outer circumferential face becomes an even surface. An accuracy of the worm is influenced by a state of the outer circumferential face of the small diameter portion. By forming the outer circumferential face in the even surface, the accuracy of the worm increases. When the accuracy of the worm is low, an engagement of the worm with the worm wheel deteriorates, causing such malfunctions as a continuous noise from an engagement portion in an operation time, and low transmission efficiency. Correspondingly, by the worm-equipped armature shaft according to the present invention, the worm can be formed in high accuracy, so that the malfunctions can be prevented from occurring.

A rotary electric machine according to the present invention is provided with an armature constituted by fixing a core or by fixing a core and a commutator on the above-described worm-equipped armature shaft and winding a coil on the core, the armature being configured to be rotationally driven. Accordingly, it is possible to constitute the rotary electric machine, in which an accuracy of the worm is high.

Further, to achieve the above-described third object, a manufacturing method of an armature shaft according to the present invention is a manufacturing method of an armature shaft having an installation depressed portion at an end face thereof to install a thrust-receiving ball therein, comprising steps of:

disposing a shaft material, which is for forming the armature shaft, in a shaft-forming depressed portion of a forging mold; forming the shaft material in a predetermined shape by a cold forging process; and pushing a sliding mold having a forming projected portion, which is shaped in accordance with the installation depressed portion, into the shaft-forming depressed portion in the axial direction of the shaft-forming depressed portion to form the installation depressed portion on the end face of the shaft material.

By the above-described manufacturing method, the installation depressed portion is formed by the cold forging process. Thus, no cutting line is left on an inner face (an inner circumferential face and a bottom face) of the installation depressed portion as caused by a cutting blade in cutting process. As a result, the inner face of the installation depressed portion becomes an even surface with quite small surface roughness, and the surface roughness is greatly improved and stabilized relative to a case worked by a cutting process. Thus, even in such a case that the armature shaft rotates under large thrust force, it is possible to prevent various malfunctions from occurring such that unusual noise occurrence by bumping motions of the shaft and the ball, uneven wears of the installation depressed portion and the steel ball, and rotation loss. Further, the inner face of the installation depressed portion, which is formed by the cold forging process, is hardened by the work hardening, so that a wearing life against a rotation of the thrust-receiving ball is extended. Furthermore, by forming the installation depressed portion by the cold forging process, no cutting process step is required for forming the installation depressed portion, so that the installation depressed portion can be easily formed. In addition, it is possible to leave out a cutting process machine and the like used in the manufacturing step, so that the manufacturing cost of the armature shaft can be decreased. Further, by forming the installation depressed portion by the cold forging process, discarded material such as swarfs generated in the cutting process is not generated in the cold forging process, so that there is no possibility to leave the swarfs in the installation depressed portion. No swarf generation also prevents the malfunction from occurring such as the above-described unusual noise occurrence, uneven wears, and rotation loss.

In the above-described manufacturing method, it is desirable that a longitudinal length of the forming projected portion of the slide mold is smaller than a diameter of the thrust-receiving ball. In this case, the longitudinal length of the installation depressed portion, which is formed in the forming projected portion, becomes smaller than the diameter of the thrust-receiving ball. That is, when the thrust-receiving ball is installed in the installation depressed portion, a part of the ball protrudes therefrom. Thus, the thrust force of the armature shaft can be securely received by the thrust-receiving ball.

In the above-described manufacturing method, it is desirable that the sliding mold is pushed into the shaft-forming depressed portion to align a central axis of the forming projected portion with a central axis of the shaft-forming depressed portion. Thus, it is possible to form the installation depressed portion with ease, which can place the thrust-receiving ball to align a contact point of the thrust-receiving ball with the central axis of the armature shaft.

An armature shaft for achieving the above-described third embodiment has an installation depressed portion at an end face thereof to install a thrust-receiving ball therein, and an inner face of the installation depressed portion has a forged surface formed by a cold forging process. In this manner, the inner face of the installation depressed portion has the forged surface formed by the cold forging process, so that no cutting line is left thereon as generated by a cutting blade in cutting process. Thus, the inner face of the installation depressed portion becomes an even surface with quite small surface roughness, and the surface roughness is greatly improved and stabilized relative to a case worked by a cutting process. Thus, even in such a case that the armature shaft rotates under large thrust force, it is possible to prevent various malfunctions from occurring such that unusual noise occurrence by bumping motions of the shaft and the ball, uneven wear in the installation depressed portion and on the steel ball, and the rotation loss. Further, the inner face of the installation depressed portion, which is formed by the cold forging process, is hardened by the work hardening, so that a wearing life against a rotation of the thrust-receiving ball is extended. Furthermore, by forming the installation depressed portion by the cold forging process, no cutting process step is required for forming the installation depressed portion, so that the installation depressed portion can be easily formed. In addition, it is possible to leave out a cutting process machine and the like used in the manufacturing step, so that the manufacturing cost of the armature shaft can be decreased. Further, by forming the installation depressed portion by the cold forging process, discarded material such as swarfs generated in the cutting process is not generated in the cold forging process, so that there is no possibility to leave the swarfs in the installation depressed portion. No swarf generation also prevents the malfunction from occurring such as the above-described unusual noise occurrence, uneven wears, and rotation loss.

In the above-described armature shaft, it is desirable that a longitudinal length of the installation depressed portion is smaller than a diameter of the thrust-receiving ball. Thus, when the thrust-receiving ball is installed in the installation depressed portion, a part of the ball protrudes therefrom. Accordingly, the thrust force of the armature shaft can be securely received by the thrust-receiving ball.

In the above-described armature shaft, it is desirable that the installation depressed portion is provided to align a central axis thereof with a central axis of the armature shaft. Thus, when the thrust-receiving ball is installed in the installation depressed portion, it is possible to place the thrust-receiving ball to align a contact point of the thrust-receiving ball with the central axis of the armature shaft. Thus, it is possible to receive the thrust force of the armature shaft approximately on one straight line. As a result, it is possible to prevent the installation depressed portion from being unevenly worn, and unusual noise by uneven wear can be prevented from occurring.

In the above-described armature shaft, a worm may be formed in a part thereof. In a case that the worm is formed in a part of the armature shaft, a rotational reaction force from the worm wheel in driving the worm wheel engaged with the worm generates a thrust force in the armature shaft. However, by providing the armature shaft with the above-described construction, shakes and vibrations of the armature shaft in the driving time are greatly decreased.

A rotary electric machine to achieve the above-described third object is derived by using the armature shaft having the above-described construction. That is, in the rotary electric machine, it is possible to prevent various malfunctions from occurring such as unusual noise occurrence, uneven wear and rotation loss in the armature shaft.

BEST MODE FOR CARRYING OUT THE INVENTION

In the following is described an embodiment reducing the present invention into practice in accordance with drawings.

Figure 1:
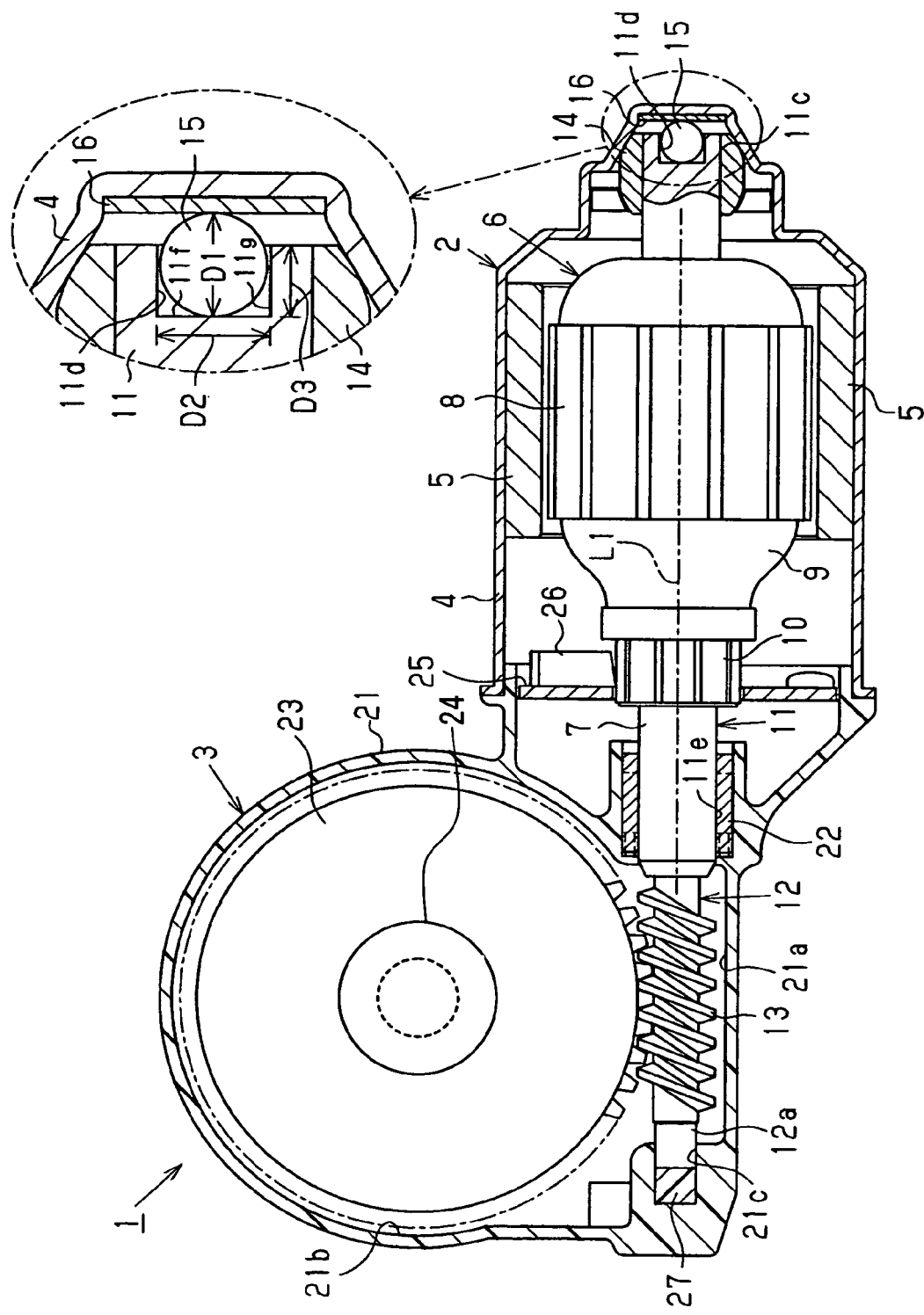
FIG. 1 is a cross-sectional view showing a motor provided with an armature shaft according to an embodiment.

FIG. 1 depicts a motor 1 according to the present embodiment. The motor 1 of the present embodiment is a motor used for a driving power source of a vehicular wiper apparatus. The motor 1 is one having a speed reduction mechanism in which a motor body 2 and a speed reduction portion 3 for installing a speed reduction mechanism are integrally put together.

The motor body 2 is constituted by a DC motor, and has a bottomed cylindrical yoke housing 4. A pair of magnets 5 are fixed on an inner face of the yoke housing 4. An armature 6 is rotatably installed inside the magnets 5. The armature 6 is provided with an armature shaft 7, a core 8, a coil 9 and a commutator 10.

Figure 2:
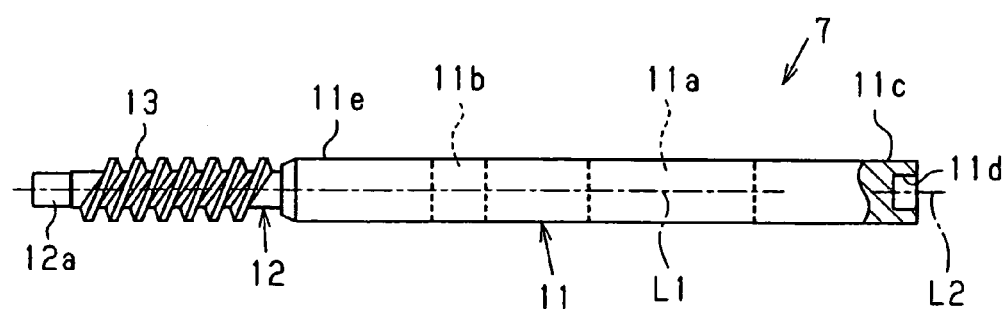
FIG. 2 is a plan view of the armature shaft.

In the armature shaft 7, as shown in FIG. 2, a shaft body 11 is between a base end portion to a leading end portion side specific portion, and a small diameter portion 12, which is smaller in diameter than the shaft body 11, is the leading end portion side of the shaft body 11. In the small diameter portion 12 is formed a worm 13.

An approximately middle portion of the shaft body 11 is a core fixing portion 11a to fix the core 8 thereon, and a specific portion at a leading end side than the core fixing portion 11a is a commutator fixing portion 11b to fix the commutator 10 thereon. A base end portion of the shaft body 11 is a base end bearing portion 11c. As shown in FIG. 1, the base end bearing portion 11c is a portion that is supported in a radial direction by a sliding bearing 14, which is fixed on a center of a bottom portion of the yoke housing 4. Further, on an end face of the shaft body 11 (the base end bearing portion 11c) is formed an installation depressed portion 11d with a circular cross-section to install a steel ball 15 that serves as a thrust-receiving ball to receive a thrust force of the armature shaft 7. As shown in FIG. 2, the installation depressed portion 11d is provided to align a central axis L2 thereof with a central axis L1 of the armature shaft 7. The installation depressed portion 11d is configured so that an inner diameter D2 thereof is slightly larger than a diameter D1 of the steel ball 15 and a longitudinal length D3 thereof is smaller than the diameter D1 of the steel ball 15 (yet larger than D½). That is, in a state that the steel ball 15 is installed in the installation depressed portion 11d to be in contact with a bottom face 11f of the installation depressed portion 11d, a slight gap is provided between an inner circumferential face 11g of the installation depressed portion 11d and the steel ball 15, and a part of the steel ball 15 protrudes from the installation depressed portion 11d. In this regard, as described below, a cold forging process is applied to the armature shaft 7 at a step before the worm 13 is formed, and the installation depressed portion 11d is formed in the cold forging process. Accordingly, an inner face of the installation depressed portion 11d, that is, the bottom face 11f and the inner circumferential face 11g is a forged surface.

A leading end portion of the shaft body 11, that is, the approximately middle portion of the armature shaft 7 is a middle bearing portion 11e. The middle bearing portion 11e is a portion that is supported in the radial direction by a sliding bearing 22, which is fixed on a gear housing 21 of the speed reduction portion 3. A leading end side portion than the middle bearing portion 11e is the small diameter portion 12, which is smaller in diameter than the shaft body 11. In the small diameter portion 12 is formed a worm 13. An outer diameter of the worm 13 is formed to be slightly smaller than a diameter of the middle bearing portion 11e (the shaft body 11). A leading end portion of the small diameter portion 12 is formed to be still smaller, and serves as a leading end bearing portion 12a that is inserted in an insertion hole 21c, which is formed on the gear housing 21, to be supported in the radial direction in the insertion hole 21c. In addition, in a cavity formed at a leading end face side of the leading end bearing portion 12a in the insertion hole 21c is filled and solidified a resinous material 27. The solidified resinous material 27 and a leading end face of the armature shaft 7 (the leading end face of the leading end bearing portion 12a) provide a slight gap therebetween to receive a thrust of the shaft 7.

Further, on the core fixing portion 11a of the armature shaft 7 is fixed the core 8, on the commutator fixing portion 11b is fixed the commutator 10, and on the fixed core 8 and commutator 10 is wound the coil 9, to constitute the armature 6. In the installation depressed portion 11d at the base end portion of the armature shaft 7 is installed the steel ball 15 that receives the thrust force of the shaft 7. The armature 6 is installed in the yoke housing 4 on which the magnets 5 are fixed in such a manner that the base end bearing portion 11c of the armature shaft 7 is inserted in the sliding bearing 14 at the bottom portion of the yoke housing 4 and the steel ball 15 is in contact with a thrust-receiving plate 16, which is fixed on the bottom portion. Then, the yoke housing 4 (the motor body 2), which installs the armature 6 therein, is put to the gear housing 21 (the speed reduction portion 3). In this assembling state, both contact points of the steel ball 15 with the armature shaft 7 and with the thrust-receiving plate 16 are aligned with the central axis L1 of the shaft 7, to realize a construction to receive the thrust force of the armature shaft 7 on one straight line.

The speed reduction portion 3 has a gear housing 21. The gear housing 21 has a specific shape provided with a shaft receiving portion 21a to install the leading end side portion of the armature shaft 7 extending from the motor body 2 and a wheel receiving portion 21b to install a worm wheel 23 therein.

On a base end portion of the shaft receiving portion 21a is fixed the sliding bearing 22 that supports the middle bearing portion 11e of the armature shaft 7 in the radial direction. In a leading end portion of the shaft receiving portion 21a is formed the insertion hole 21c, into which the leading end bearing portion 12a of the armature shaft 7 (the small diameter portion 12) is inserted so that the portion 12a is supported in the radial direction. In putting the motor body 2 on the gear housing 21, the leading end side portion (the worm 13 and the leading end bearing portion 12a) of the armature shaft 7 is inserted in the sliding bearing 22 to be installed in the shaft receiving portion 21a. At this time, the outer diameter of the worm 13 is formed to be slightly smaller than the outer diameter of the middle bearing portion 11e, that is, the inner diameter of the sliding bearing 22, so that the worm 13 does not come in contact with an inner circumferential face of the sliding bearing 22.

In the wheel receiving portion 21b is rotatably installed a worm wheel 23, which is engaged with the worm 13 of the armature shaft 7. The worm wheel 23 is provided with an output shaft 24 to rotate integrally.

In the gear housing 21 is fixed a brush device 25 at a position to face with the motor body 2. On the brush device 25 is held a feeding brush 26 that is in slide contact with the commutator 10. The brush device 25 receives an electric power via a feeder wire (not shown) from an external device, and supplies the electric power via the feeding brush 26 and the commutator 10 to the armature 6 (the coil 9). Thus, the armature 6 rotates and the armature shaft 7 rotates, thereby the output shaft 24 are rotated via the worm 13 and the worm wheel 23, to actuate the wiper apparatus in accordance with a rotation of the output shaft 24.

In the following is described a manufacturing procedure of the worm-equipped armature shaft 7 used in the present embodiment.

Figure 3A:
FIGS. 3A and 3B are explanatory diagrams for explaining a shaft material.
Figure 3B:
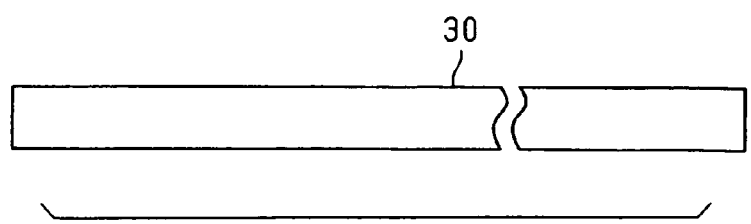

The armature shaft 7 is manufactured by working such a cylindrical shaft material 30 as shown in FIGS. 3A and 3B. In the leading end side portion of the shaft material 30 is formed the small diameter portion 12 (including the leading end bearing portion 12a) by use of a forging mold 31 shown in FIG. 4, then a cold forging process is applied to a base end face of the shaft material 30 to form the installation depressed portion 11d therein (forging process step).

Figure 4:
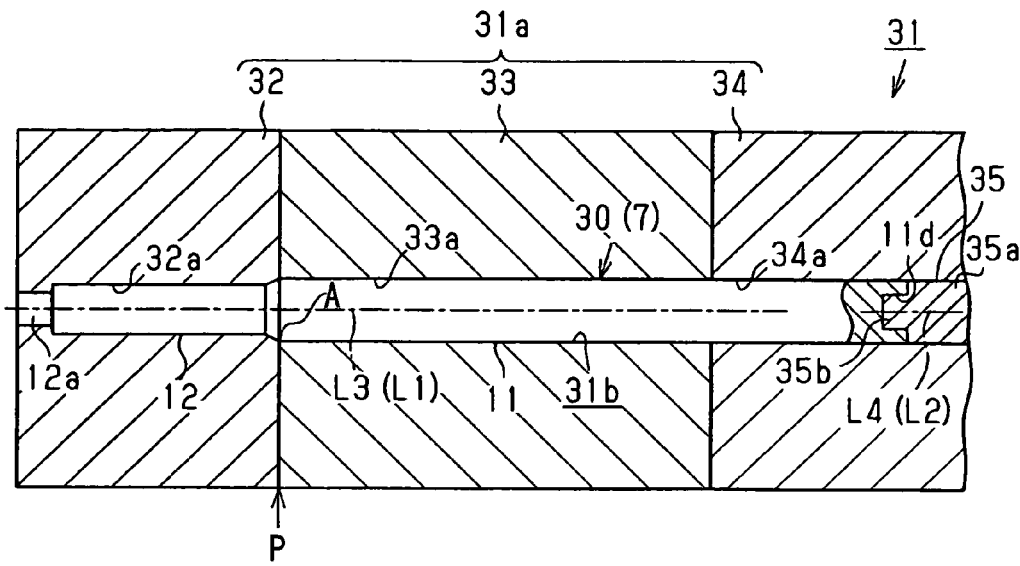
FIG. 4 is an explanatory diagram for explaining a forging process step in a manufacturing procedure of the armature shaft.

The forging mold 31 is provided with a pair of body molds 31a (one of the body molds 31a is shown in FIG. 4) that can be split into two and put together again to dispose the shaft material 30 therebetween, and a sliding mold 35 that is pushed into the body mold 31a. The body mold 31a has a construction to be split into three including a first to a third mold portions 32 to 34 in the axial direction of the shaft material 30 (the pushing direction of the sliding mold 35), and has a shaft-forming depressed portion 31b that extends from the first to the third mold portions 32 to 34 to form the armature shaft 7.

The first mold portion 32 is a small diameter portion forming mold portion, and provided with a small diameter portion forming depressed portion 32a for forming the small diameter portion 12 (including the leading end bearing portion 12a) by forging the leading end portion of the shaft material 30. The second mold portion 33 and the third mold portion 34 serve as a shaft body supporting mold portion, and respectively provided with shaft body supporting depressed portions 33a, 34a for supporting the shaft body 11 when the first mold portion 32 forms the small diameter portion 12 in the first mold portion 32. These small diameter portion forming depressed portion 32a and the shaft body supporting depressed portions 33a, 34a constitute the shaft-forming depressed portion 31b.

By the body mold 31a having such a construction as described above is formed the small diameter portion 12 in the leading end portion of the shaft material 30. In this case, a surface of a processed portion by the cold forging becomes an even surface as commonly known, and the outer circumferential face of the small diameter portion 12 formed by the cold forging process becomes an even surface. That is, the small diameter portion 12 processed by the cold forging process is improved in a surface roughness in the outer circumferential face than processed by a cutting process.

Correspondingly, the sliding mold 35 is slidably provided in the body mold 31a, that is, in the shaft body supporting depressed portion 34a. In the sliding mold 35 are formed a cylindrical body portion 35a that is approximately as large in diameter as (slightly smaller in diameter than) the inner diameter of the shaft body supporting depressed portion, and a forming projected portion 35b at a leading end center portion of the body portion 35a that corresponds with the installation depressed portion 11d. An outer diameter of the forming projected portion 35b corresponds with the inner diameter D2 of the installation depressed portion 11d, and a longitudinal length thereof corresponds with the longitudinal length D3 of the installation depressed portion 11d. That is, the outer diameter (D2) of the forming projected portion 35b is slightly larger than the diameter D1 of the steel ball 15, and the longitudinal length (D3) of the forming projected portion 35b is smaller than the diameter D1 of the steel ball 15 (yet larger than D½). In addition, to form the installation depressed portion 11d in such a manner to align the central axis L2 of the installation depressed portion 11d with the central axis L1 of the armature shaft 7, the sliding mold 35 (the forming projected portion 35b) is provided to align a central axis L4 with the central axis L3 of an inner space of the body mold 31a (such as the shaft body supporting depressed portion 34a), and pushed into the shaft body supporting depressed portion 34a along the axis L3. While the small diameter portion 12 (including the leading end bearing portion 12a) is formed in the leading end portion of the shaft material 30 in the body mold 31a, on the base end face of the shaft material 30 is formed the installation depressed portion 11d in the sliding mold 35.

In performing the cold forging process, on the small diameter portion forming depressed portion 32a of the body mold 31a and the shaft body supporting depressed portions 33a, 34a are painted lubricating oil for protecting the shaft material 30. In this regard, a step A is formed between the first mold portion 32 having the small diameter portion forming depressed portion 32a and the second mold portion 33 having the shaft body supporting depressed portion 33a. That is, lubricating oil tends to accumulate at the step A. The body mold 31a according to the present embodiment has such a construction that a mold split face P between the first mold portion 32 and the second mold portion 33 is positioned at the step A portion, so that the lubricating oil accumulated at the step A is easily discharged outward through a gap at the mold split face P. Accordingly, an accumulation of lubricating oil at the step A does not deteriorate the process of the shaft material 30.

Figure 5:
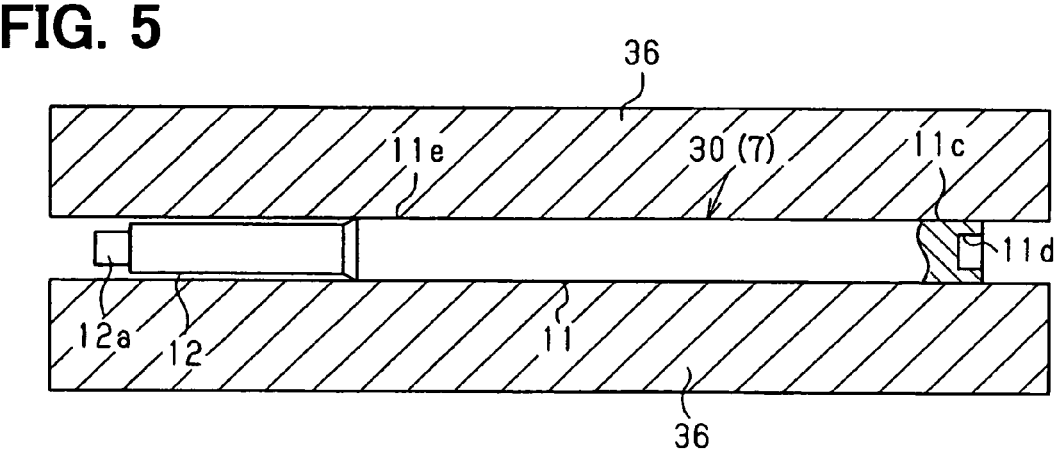
FIG. 5 is an explanatory diagram for explaining a grinding process step in the manufacturing procedure of the armature shaft.

Subsequently, as shown in FIG. 5, to form the base end bearing portion 11c of the shaft body 11 and the outer circumferential face of the middle bearing portion 11e, grinding stone 36 is brought in slight contact with an outer circumferential face of the shaft body 11, to apply a grinding process to the entire outer circumferential face of the shaft body 11. That is, by the grinding process, the surface roughness and circle perfection in the base end bearing portion 11c and the outer circumferential face of the middle bearing portion 11e are improved.

Figure 6:
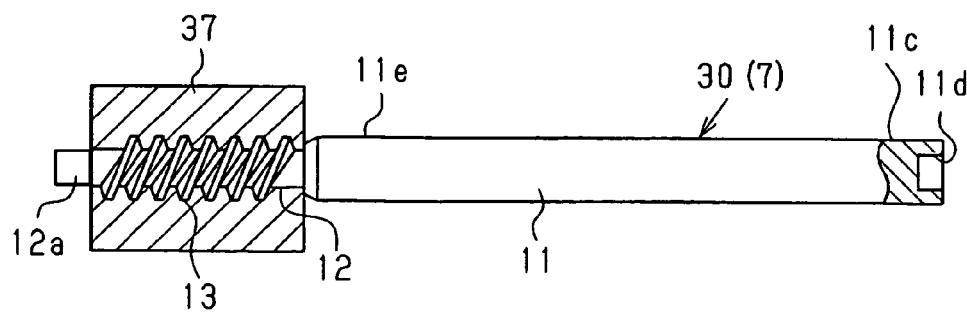
FIG. 6 is an explanatory diagram for explaining a worm forming process step in the manufacturing procedure of the armature shaft.
Figure 7:
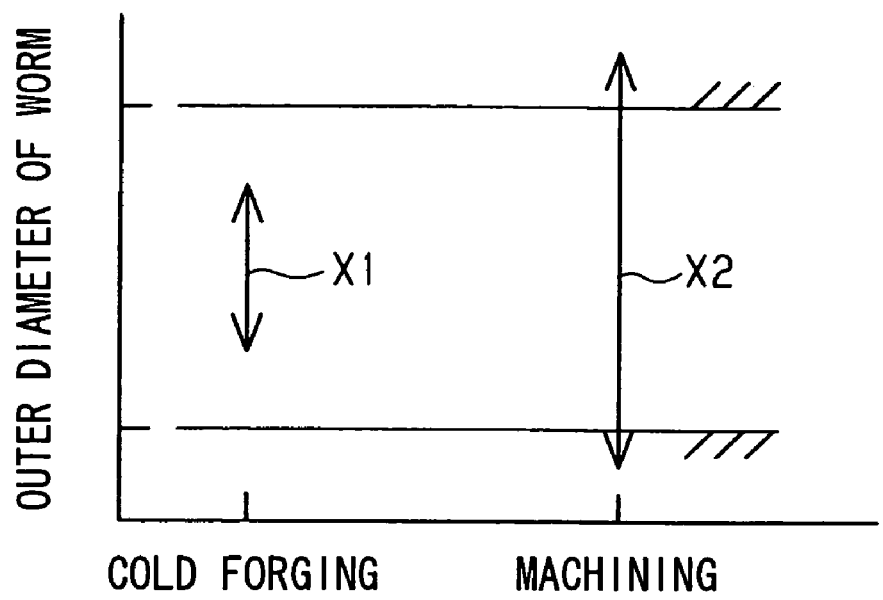
FIG. 7 is a graph showing an accuracy of the worm formed on the armature shaft.

Subsequently, as shown in FIG. 6, the small diameter portion 12, to which the cold forging process is applied, is bound between the rolled dies 37, and by rolling or shifting the rolled dies 37, the worm 13 is formed (worm forming process step). In this case, the small diameter portion 12 is formed by the cold forging process, the outer circumferential face of the small diameter portion 12 becomes an even surface relative to a conventional in which the small diameter portion 12 is formed by a cutting process. Accordingly, as shown in FIG. 7, a variation range X1 of the outer diameter of the worm 13 according to the present embodiment in which the small diameter portion 12 is worked by the cold forging process is sufficiently small relative to a variation range X2 of an outer diameter of a worm in a conventional case in which the small diameter portion is worked by a cutting process. That is, an accuracy in the worm 13 is increased in the present embodiment.

Further, in the present embodiment, a working fiducial position in forming (rolling) the worm 13 is the outer circumferential face of the shaft body 11. Thus, by applying the grinding process to the outer circumferential face of the shaft body 11, which is to be the working fiducial position, the accuracy of the worm 13 is further increased. The worm-equipped armature shaft 7 is manufactured as described above in the present embodiment.

Figure 8:
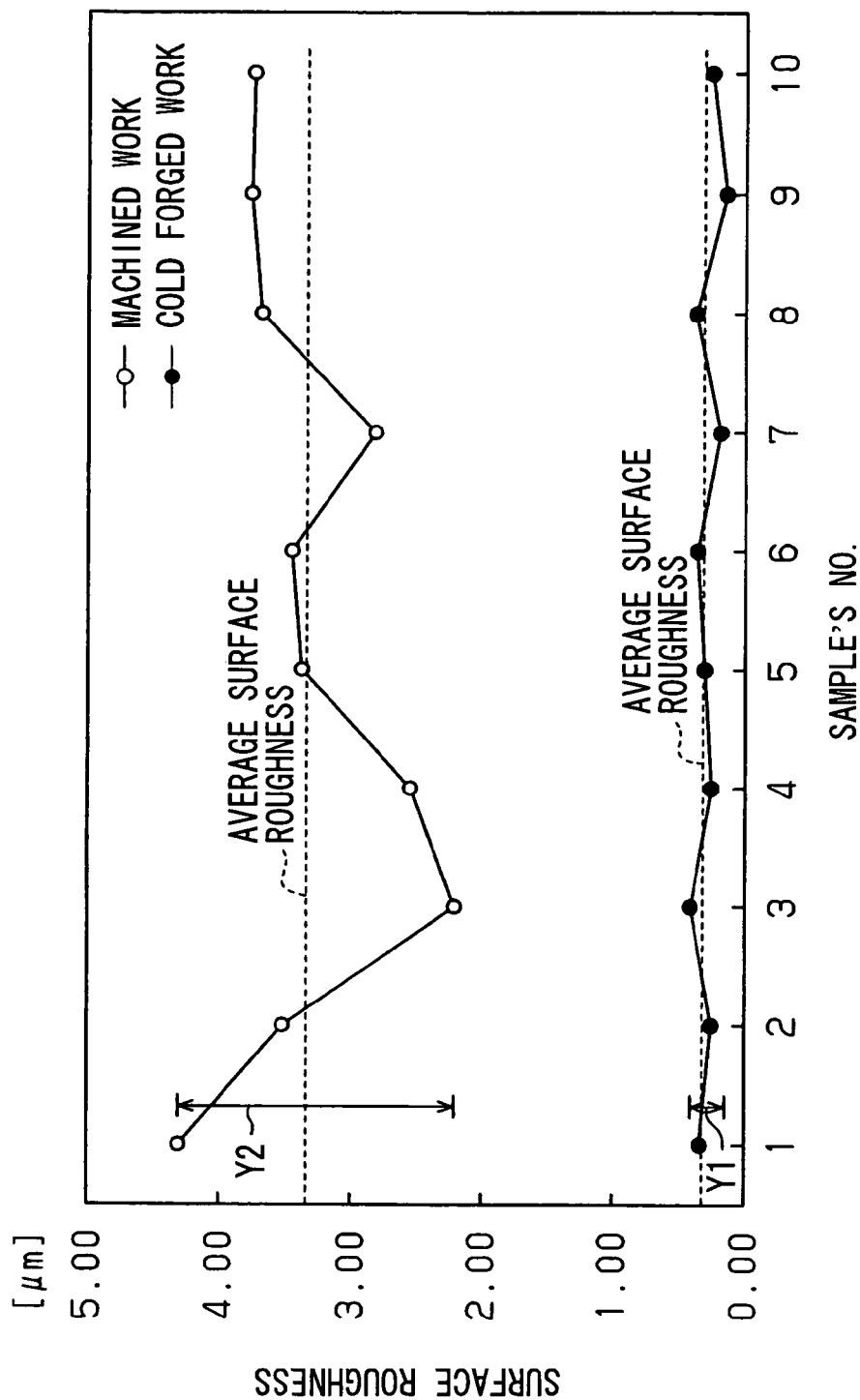
FIG. 8 is a graph showing a comparison of the surface roughness of an installation depressed portion according to difference of process.

In the armature shaft 7 that is manufactured as described above, also the inner circumferential face 11g and the bottom face 11f of the installation depressed portion 11d is formed by the cold forging process in an analogous fashion to the outer circumferential face of the small diameter portion 12. Thus, in the cold forging process is left no cutting line as generated by a cutting blade in cutting process, the faces become an even surface with a quite small surface roughness, and the surface roughness is greatly improved and stabilized relative to a case worked by a cutting process. In this regard, FIG. 8 shows a comparison of the surface roughness of the inner circumferential face 11g and the bottom face 11f of the installation depressed portion 11d, in which ten samples are taken in each of the samples provided with the installation depressed portion 11d formed by the cold forging process and the samples provided with the installation depressed portion 11d by the cutting process. As shown in FIG. 8, the ones provided with the installation depressed portions 11d by the cold forging process is quite small in the surface roughness in the inner circumferential face 11g and the bottom face 11f relative to the others provided with the installation depressed portions 11d by the cutting process. Further, the ones provided with the installation depressed portion 11d by the cold forging process is quite small also in variation range Y1 relative to the variation range Y2 of the others provided with the installation depressed portions 11d by the cutting process.

As described above, not only the surface roughness of the inner circumferential face 11g and the bottom face 11f of the installation depressed portion 11d is quite small, but also the variation of the surface roughness thereof is small and stabilized. Thus, in such a case that armature shaft 7 rotates under large thrust force, it is possible to prevent various malfunctions from occurring such as unusual noise occurrence by the bumping motions of the shaft 7 and the steel ball 15, uneven wears of the installation depressed portion 11d and the steel ball 15, and rotation loss.

Further, the inner circumferential face 11g and the bottom face 11f of the installation depressed portion 11d, which are formed by the cold forging process, are hardened by the work hardening, so that the wearing life against the rotation of the steel ball 15 is extended. Furthermore, by forming the installation depressed portion 11d by the cold forging process in the same manufacturing step as the small diameter portion 12, it is possible to leave out a cutting process step for forming the installation depressed portion 11d, so that the installation depressed portion 11d can be easily formed. In addition, it is possible to leave out a cutting process machine and the like used in the manufacturing step, so that the manufacturing cost of the armature shaft 7 can be decreased. Further, by forming the installation depressed portion 11d by the cold forging process, discarded material such as swarfs produced in the cutting process is not produced in the cold forging process, so that there is no possibility to leave the swarfs in the installation depressed portion 11d. No swarf generation also prevents the malfunction from occurring such as the above-described unusual noise occurrence, uneven wears, and rotation loss.

As described above, the present embodiment serves the following effects.

(1) In the forging process step, the cold forging process using the forging mold 31 forms the small diameter portion 12 on the cylindrical shaft material 30. Then, in the worm forming process step after the forging process step, the worm 13 is formed by the rolled die 37 in the small diameter portion 12, to manufacture the worm-equipped armature shaft 7. That is, when the small diameter portion 12 is formed by the cold forging process, the surface roughness of the outer circumferential face of the small diameter portion 12 is improved than a case when the small diameter portion is formed by the cutting process, and the outer circumferential face becomes an even surface. The accuracy of the worm 13 is subjected to a state of the outer circumferential face of the small diameter portion 12, thus the accuracy of the worm 13 is improved by forming the outer circumferential face thereof in an even surface. Accordingly, it is possible to provide the motor 1 with the armature shaft 7 with a worm 13 with high accuracy and the shaft 7.

Specifically, a low accuracy of the worm 13 may cause a malfunction to deteriorate the engagement with the worm wheel 23 to make a noise at the engaging portion continuously in an operation time and transmission efficiency. Accordingly, in forming the worm 13, it is necessary to form that in quite high accuracy. The present embodiment is especially effective for this necessity.

(2) In the forging process step, while the small diameter portion 12 is formed in the shaft material 30, the leading eng bearing portion 12a is formed in the shaft material 30 at the leading end portion of the leading small diameter portion 12 thereof. Accordingly, it is not necessary to prepare a manufacturing step to form the leading end bearing portion 12a, to prevent manufacturing steps from increasing.

(3) In the forging process step, while the small diameter portion 12 is formed in the shaft material 30, the depressed portion 11d is formed on the base end face of the shaft material 30. Accordingly, it is not necessary to prepare a manufacturing step to form the depressed portion 11d, to prevent manufacturing steps from increasing.

(4) The forging mold 31 is provided with: the first mold portion 32 for forming the small diameter portion 12 in the shaft material 30; and the second mold portion 33 and the third mold portion 34 for supporting a portion of the shaft material 30 corresponding to the shaft body 11. That is, relatively large load acts on the first mold portion 32 in the forging mold 31, and the wear in the first mold portion 32 is larger than those in the second mold portion 33 and the third mold portion 34. Thus, by separating these mold portions 32 to 34 from each other, it becomes possible to replace only the first mold portion 32. As a result, the second mold portion 33 and the third mold portion 34, which are not necessary to be replaced together with the first mold portion 32, can be continuously used, so that it is possible to decrease a cost required for the forging mold 31 and a manufacturing cost.

In addition, in the cold forging process, lubricating oil is put on the working depressed portion 32a and the supporting depressed portions 33a, 34a of the first to the third mold portions 32 to 34 of the forging mold 31. In this regard, a step A is provided between the first mold portion 32 and the second mold portion 33, and the lubricating oil is tend to accumulate at the step A. However, in the forging mold 31, the split face P between the first mold portion 32 and the second mold portion 33 is placed at the step A portion, so that the lubricating oil accumulated at the step A can be easily discharged through the gap at the split face P. Accordingly, it is possible to prevent the lubricating oil accumulated at the step A from causing a malfunction in processing the shaft material 30.

(5) The second mold portion 33 and the third mold portion 34 are configured so that they can be split into two in the axial direction of the shaft 7. Thus, in a case to manufacture various types of the worm-equipped armature shaft 7 having varied lengths in the shaft body 11, it is possible to adapt to them with ease by replacing only the third mold portion 34 for example, in accordance with the length of the shaft body 11.

(6) The installation depressed portion 11d is formed on the end face of the shaft material 30, by pushing the sliding mold 35, which has forming projected portion 35b shaped in accordance with the installation depressed portion 11d for receiving the steel ball 15, into the forming depressed portion 31b in a direction of the axis L3 of the shaft-forming depressed portion 31b. Thus, the armature shaft 7 is manufactured to have the installation depressed portion 11d on the end face thereof. That is, the inner face (inner circumferential face 11g and the bottom face 11f) of the installation depressed portion 11d, which is formed by the cold forging process, is a forged surface. No cutting line is left in the cold forging process as generated by cutting blades in cutting process. Accordingly, the inner face becomes an even surface with quite small surface roughness, and the surface roughness is greatly improved and stabilized relative to a case when the cutting process is performed. Thus, it is possible to prevent various malfunctions from occurring such as: an unusual noise occurrence caused by bumping movements of the shaft 7 and the steel ball 15 in the in such a case that the armature shaft 7 rotates in receiving a large thrust force; an uneven wear in the installation depressed portion 11d and the steel ball 15; and a transmission loss. Further, the inner face (the inner circumferential face 11g and the bottom face 11f) of the installation depressed portion 11d, which is formed by the cold forging process is hardened by the work hardening, so that a wearing life against the rotation of the steel ball 15 can be extended. Furthermore, by forming the installation depressed portion 11d by the cold forging process, a cutting process step for forming the installation depressed portion 11d is not necessary, so that the installation depressed portion 11d can be easily formed. In addition, it is possible to leave out a cutting process machine and the like used in the manufacturing step, so that it is possible to decrease the manufacturing cost of the armature shaft 7. Further, by forming the installation depressed portion 11d by the cold forging process, discarded material such as swarfs produced in the cutting process is not produced in the cold forging process, so that there is no possibility to leave the swarfs in the installation depressed portion 11d. No swarf generation also prevents the malfunction from occurring such as the above-described unusual noise occurrence, uneven wears, and rotation loss.

Further, in a case that the armature shaft 7 is applied to a motor, especially to the motor 1 according to the present embodiment, which is provided with the worm speed reduction mechanism, a reaction rotational force from the worm wheel 23 in driving the worm wheel 23 engaged with the worm 13, acts as the thrust force of the armature shaft 7. However, by using the armature shaft 7 according to the present embodiment, shakes and vibrations of the armature shaft 7 in the driving time becomes quite small (the effect is large especially in the long armature shaft 7 on which the worm 13 is integrally carved thereon as in the present embodiment). Thus, it is possible to construct the motor, which is quite silent.

(7) The longitudinal length (D3) of the forming projected portion 35b of the sliding mold 35 is smaller than a diameter D1 of the steel ball 15, so that the longitudinal length (D3) of the installation depressed portion 11d, which is formed in the forming projected portion 35b is smaller than the diameter D1 of the steel ball 15. That is, the installation depressed portion 11d can be easily formed so that a part of the steel ball 15 protrudes therefrom when the installation depressed portion 11d receives the steel ball 15 therein. Further, a part of the steel ball 15 protrudes from the end portion of the armature shaft 7 when the installation depressed portion 11d receives the steel ball 15 therein, so that the thrust force of the armature shaft 7 can be securely received by the steel ball 15.

(8) The sliding mold 35 (forming projected portion 35b) is arranged to align its central axis L4 with the central axis L3 of the shaft-forming depressed portion 31b, then pushed into the shaft-forming depressed portion 31b. That is, the installation depressed portion 11d can be easily formed to arrange the steel ball 15 therein to place the contact point of the steel ball 15 on the central axis L1 of the armature shaft 7. Further, in installing the steel ball 15 in the installation depressed portion 11d, the steel ball 15 is arranged to place the contact point of the steel ball 15 on the central axis of the central axis L1 (L2). Thus, the thrust force of the armature shaft 7 can be received approximately on one straight line, so that the installation depressed portion 11d can be prevented from being unevenly worn, and an unusual noise by uneven wear can be prevented from occurring.

This embodiment of the present invention can be modified as follows.

The construction of the forging mold 31 in the above-described embodiment is not to be limited to this one, and can be modified as appropriate. For example, splitting positions and numbers of the body mold 31a can be modified as appropriate. Especially in the above-described embodiment, the split face P is positioned at the step A portion between the first mold portion 32 and the second mold portion 33. However, the split face P may be provided in the second mold portion 33 to be close to the step A portion. Further, the first to the third mold portions 32 to 34 may be integrally formed in a body mold 31a. Furthermore, the sliding mold 35 may have such a construction that only the forming projected portion 35b slides in the direction of the axis L3.

In the above-described embodiment, the leading end bearing portion 12a and the installation depressed portion 11d are formed in the shaft material 30 while the small diameter portion 12 is formed in the shaft material 30. Alternatively, the leading end bearing portion 12a and the installation depressed portion 11d may be formed at different times.

Figure 9:
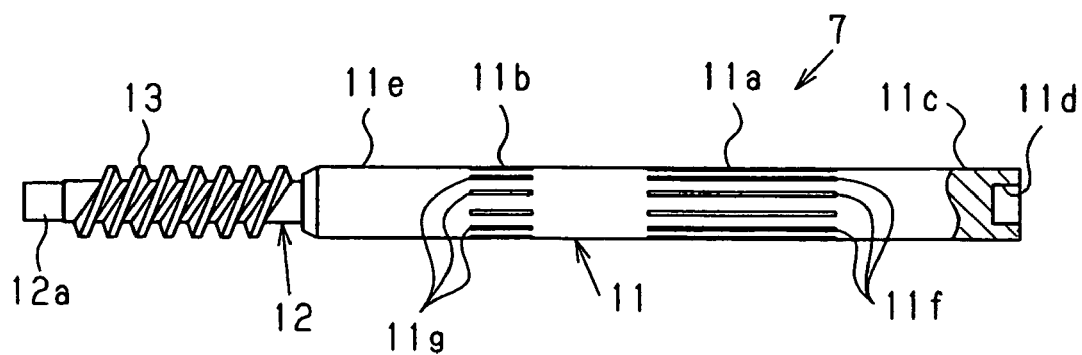
FIG. 9 is a plan view showing an armature shaft according to a modified embodiment.

The shape of the armature shaft 7 in the above-described embodiment is not limited to this, and can be modified as appropriate. For example, as shown in FIG. 9, the outer circumferential faces of the core fixing portion 11a and commutator fixing portion 11b may be respectively worked by knurling process, to form a plurality of the projected lines 11f, 11g in the circumferential direction. According to this process, the projected lines 11f, 11g are engaged with the core 8 and the commutator 10, so that the core and the commutator 10 can be stiffly fixed on the shaft 7.

The shape of the installation depressed portion 11d in the above-described embodiment is not intended to be limited to this, and can be modified as appropriate.

In the above-described embodiment, the thrust-receiving ball is realized by the steel ball 15. Alternatively, the thrust-receiving ball may use material other than steel.

The above-described embodiment is applied to the armature shaft 7 in which the worm 13 is integrally formed. The shape of the armature shaft 7 is mot limited to this embodiment, and can be modified as appropriate.

The above-described embodiment is described on the armature shaft 7 adopted in the DC motor (motor body 2) having the commutator 10. Alternatively, the present invention can be applied to an armature shaft of a motor having no commutator 10.

In the above-described embodiment, the armature shaft 7 is applied to the motor 1 (the rotary electric machine) used for the vehicular wiper apparatus, however, it may be applied to an armature shaft of a motor (a rotary electric machine) used for other kind of apparatus.

The invention claimed is:

1. A manufacturing method of a worm-equipped armature shaft to provide a cylindrical shaft material with a small diameter portion in a leading end side portion of a shaft body, which has a fixing portion to fix a core or to fix a core and a commutator thereon and has a bearing portion to be supported by a bearing, and with a worm in the small diameter portion, comprising:
   a forging process step, in which the small diameter portion is formed in the shaft material by a cold forging process using a forging mold provided with a small diameter portion forming mold portion for forming the small diameter portion and a shaft body supporting mold portion for supporting a portion corresponding to the shaft body; and
   a worm forming process step after the forging process step, in which the worm is formed in the small diameter portion by a rolling die.

2. The manufacturing method of a worm-equipped armature shaft according to claim 1, wherein a split face is placed at a step portion or at a proximity to the step portion, which is formed between a first mold portion constituting the small diameter portion forming mold portion and a second mold portion constituting the shaft body supporting mold portion.

3. The manufacturing method of a worm-equipped armature shaft according to claim 2, wherein the split face is placed at the proximity to the step portion in the second mold portion constituting the shaft body supporting portion.

4. The manufacturing method of a worm-equipped armature shaft according to claim 2, wherein the split face is placed at the step portion formed between the first mold portion constituting the small diameter portion forming mold portion and the second mold portion constituting the shaft body supporting portion.

5. The manufacturing method of a worm-equipped armature shaft according to claim 1, wherein:
   a leading end bearing portion is formed in a leading end portion of the small diameter portion; and
   the leading end bearing portion is formed simultaneously the small diameter portion in the shaft material in the forging process step.

6. The manufacturing method of a worm-equipped armature shaft according to claim 1, wherein:
   a depressed bearing portion is formed on a base end face of the shaft body; and
   the depressed portion is formed simultaneously with the small diameter portion in the shaft material in the forging process step.

7. The manufacturing method of a worm-equipped armature shaft according to claim 1, wherein the shaft body supporting mold portion can be separated into a plurality of mold portions in an axial direction of the armature shaft.

8. The manufacturing method according to claim 1, further comprising a grinding process step, which is performed after the forging process step and before the worm fanning process step, wherein the entirety of the circumferential face of the shaft body is ground by bringing a grinding stone into a slide contact with the outer circumferential face of the shaft body.

9. The manufacturing method of a worm-equipped armature shaft according to claim 8, wherein lubricating oil, which is put on the outer circumferential face of the shaft body in the forging process step, is removed simultaneously in the grinding process step.

10. A manufacturing method of a worm-equipped armature shaft, which includes a small diameter portion at one end thereof and a body portion at the other end thereof, the method comprising:
    inserting a cylindrical shaft material into a forging mold, which includes a section for forming the small diameter portion at one end and a section for forming the body portion at another other end;
    forging the cylindrical shaft material to form the small diameter portion and the body portion from the cylindrical shaft material;
    grinding an outer circumferential surface of the body portion; and
    applying a rolled die on the surface of the small diameter portion to form a worm thereon.

11. The manufacturing method according to claim 10 further comprising:
    fixing a core and a commutator to the body portion; and
    winding a coil on the core.

* * * * *